United States Patent [19]

Krishnan et al.

[11] Patent Number: 4,650,823
[45] Date of Patent: Mar. 17, 1987

[54] IRON OXIDE PIGMENTED, POLYCARBONATE COMPOSITIONS

[75] Inventors: Sivaram Krishnan, Pittsburgh, Pa.; Ronald L. Price, Moundsville, W. Va.; Roger J. White, Pittsburgh, Pa.

[73] Assignee: Mobay Corporation, Pittsburgh, Pa.

[21] Appl. No.: 766,746

[22] Filed: Aug. 16, 1985

[51] Int. Cl.$^4$ ................................................ C08K 3/22
[52] U.S. Cl. .................................... 524/431; 524/502; 524/611
[58] Field of Search ...................... 524/431, 502, 611; 525/146

[56] References Cited

U.S. PATENT DOCUMENTS

| | | | |
|---|---|---|---|
| 3,507,951 | 4/1970 | Morecroft et al. | 524/611 |
| 3,761,440 | 9/1973 | Margotte et al. | 260/37 |
| 3,875,123 | 4/1975 | Margotte et al. | 260/78.4 |
| 4,017,457 | 4/1977 | Baron et al. | 260/45.75 |
| 4,049,614 | 9/1977 | Baron | 260/37 |
| 4,223,100 | 9/1980 | Reinert | 525/146 |
| 4,279,244 | 7/1981 | McAlister | 126/450 |
| 4,289,745 | 9/1981 | Patil | 423/594 |

FOREIGN PATENT DOCUMENTS 0103175  3/1984  European Pat. Off. ............ 524/431

OTHER PUBLICATIONS

Transparent Iron Oxide Pigments for Automotive Applications, Wolfgang E. Adams, NATEC '83 Society of Plastics Engineers, Brookfield Center Conn., pp. 19-20.

*Primary Examiner*—Lewis T. Jacobs
*Attorney, Agent, or Firm*—Gene Harsh; Joseph C. Gil; Aron Preis

[57] ABSTRACT

The present invention is directed to a thermoplastic molding composition comprising a polycarbonate resin and a pigmenting amount of black iron oxide. The invention is predicated on the surprising findings that this composition yields stable, streaking-free molded articles. A preferred embodiment of the invention comprises a flame retarding agent and iron oxide based pigment selected from the group consisting of black iron oxide and red iron oxide, said flame retarding agent comprising polytetrafluoroethylene; the composition is characterized in that it is streaking-free and in that its flammability rating is at least 5V-$\frac{1}{8}$" in accordance with UL-94.

8 Claims, No Drawings

IRON OXIDE PIGMENTED, POLYCARBONATE COMPOSITIONS

FIELD OF THE INVENTION

The invention is directed to polycarbonate molding compositions and more particularly to pigmented, polycarbonate compositions.

SUMMARY OF THE INVENTION

The present invention is directed to a thermoplastic molding composition comprising a polycarbonate resin and a pigmenting amount of black iron oxide. The invention is predicated on the surprising findings that this composition yields stable, streaking-free molded articles. A preferred embodiment of the invention comprises a flame retarding agent and iron oxide based pigment selected from the group consisting of black iron oxide and red iron oxide, said flame retarding agent comprising polytetrafluoroethylene; the composition is characterized in that it is streaking-free and in that its flammability rating is at least 5V-⅛" in accordance with UL-94.

BACKGROUND OF THE INVENTION

Streaking is a term of art used to described a particular surfacial, cosmetic defect in a molded part. It is believed that this defect which appears as striations in molded pigmented articles results from poor dispersion of the pigment. Molding prepared from flame retardant, pigmented polycarbonates are susceptible to streaking particularly if the composition contains (polytetrafluoroethylene) PTFE.

Dispersion is defined as the breaking up of agglomerates of individual pigment particles which are held together by surface and/or electrostatic forces. After the breaking up of the agglomerations—by shearing action—the individual pigment particles must be wetted immediately if reagglomeration is to be prevented. A thorough dispersion of the pigment particles is essential in order to prevent pitting and streaking on the surfaces of extruded molded articles. Several solutions to the dispersion problem have been offered including adding dispersion aids—for instance, polyethylene glycol—and applying to the polycarbonate a low shear rate while applying a high shear rate to the pigment—U.S. Pat. No. 3,507,951. It is noted that this patent at col. 4, lines 20 et seq. regards iron oxide pigment to be the equivalent of carbon black. Also, U.S. Pat. No. 4,279,244 is noted to regard carbon black to be the equivalent of iron oxide pigments in a polycarbonate matrix—see col. 22, lines 24-25. Polymeric compounds containing olefinic unsaturation and epoxide groups were disclosed in U.S. Pat. No. 3,761,440 to be useful in reducing the deleterious effects caused by moisture in pigmented polycarbonates. Silica has been disclosed in U.S. Pat. No. 4,049,614 to aid in dispersing pigments in polycarbonate resins. U.S. Pat. No. 3,875,123 disclosed polymeric UV absorbers for stabilizing polycarbonates including pigmented polycarbonates. U.S. Pat. No. 4,017,457 which discloses ferrocene and ferrocene derivatives indicated that iron oxide can not be used as pigmentation agents in polycarbonates because such iron compounds cause color instability and are detrimental to the mechanical properties of the resin—see col. 3, lines 32 et seq. U.S. Pat. No. 4,289,745 disclosed acicular ferrite spinels said to be suitable as pigments in polycarbonates. Lastly, the art is noted to disclose the use of red and yellow iron oxide pigments in polycarbonate resins in *Transparent Iron Oxide Pigments for Automotive Applications*, Wolfgang E. Adams, NATEC '83 Society of Plastics Engineers, Brookfield Center Conn. p. 19-20. The suitability of iron oxide pigments in the context of the present invention is surprising in view of the art's teaching that black iron oxide starts to change color from black to brown (and finally red) at temperatures above 365° F., which is considerably below the processing temperature of polycarbonate resins, i.e., 520° F.

DETAILED DESCRIPTION OF THE INVENTION

The Polycarbonate Resin

The polycarbonate resins useful in the practice of the invention are homopolycarbonates, copolycarbonates and terpolycarbonates or mixtures thereof. The polycarbonates generally have a molecular weight of 10,000-200,000 (weight average molecular weight), preferably 20,000-80,000 and their melt flow rate, per ASTM D-1238 at 300° C., is about 1 to about 24 gm/10 min, preferably about 2-21 gm/10 min. They may be prepared, for example, by the known diphasic interface process from a carbonic acid derivative such as phosgene and dihydroxy compounds by polycondensation (see German Offenlegungsschriften Nos. 2,063,050; 2,063,052; 1,570,703; 2,211,956; 2,211,957; French Pat. No. 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the copolycarbonates of the invention conform to the structural formulae (1) or (2)

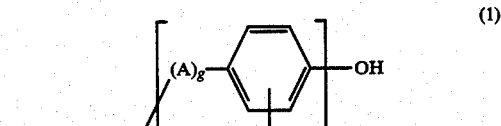

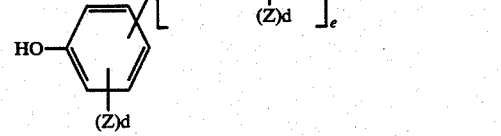

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO₂— or a radical conforming to

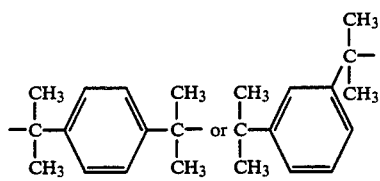

e and g both denote the number 0 to 1;

Z denotes F, Cl, Br or $C_1$-$C_4$-alkyl and if several Z radicals are substituents in one aryl radical, they may be identical or different;

d denotes 0 or an integer of from 1 to 4; and f denotes 0 or an integer of from 1 to 3.

Among the useful bisphenols in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones and α,α'-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846; all incorporated herein by reference. Further examples of suitable bisphenols are 2,2-bis-(4-hydroxyphenyl)-propane (bisphenol-A), 2,4-bis-(hydroxyphenyl)-2-methyl-butane, 1,1-bis-(4-hydroxyphenyl)-cyclohexane, α,α'-bis-(4-hydroxyphenyl)-p-diisopropyl-benzene, 2,2-bis-(3-methyl-4-hydroxyphenyl)propane, 2,2-bis-(3-chloro-4-hydroxyphenyl)-propane, bis-(3,5-dimethyl-4-hydroxyphenyl)-methane, 2,2-bis(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-2-methylbutane, 1,1-bis-(3,5-dimethyl-4-hydroxyphenyl)-cyclohexane, α, α'-bis-(3,5-dimethyl-4-hydroxyphenyl)-p-diisopropyl benzene, and 4,4'-sulfonyldiphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol-A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein. Also suitable are the resins described in U.S. Pat. No. 4,515,921 which too is incorporated herein by reference.

The polycarbonates of the invention may also be branched by condensing therein small quantities, e.g , 0.05-2.0 mol % (based on the quantity of bisphenols used) of polyhydroxyl compounds. Polycarbonates of this type have been described, for example, in German Offenlegungsschriften Nos. 1,570,553; 2,116,974 and 2,113,374; British Pat. Nos. 885,442 and 1,079,821 and U.S. Pat. Nos. 3,544,514 and 4,185,009 all of which are incorporated herein by reference. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4',4''-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the tradenames Merlon-FCR, Merlon M-39, Merlon M-40 and Merlon M-50, all of which are bisphenol-A based on homopolycarbonate resins differing in terms of their respective molecular weights and characterized in that their melt indices per ASTM D-1238 are 17-24, 12-24, 6-11.9 and 3.0-5.9 gm/10 min, respectively, all available from Mobay Chemical Corporation of Pittsburgh, Pa.

The art has long recognized that red iron oxide (α-$Fe_2O_3$) is relatively heat-stable up to 1000° C., while both yellow (α-FeOOH) and black ($Fe_3O_4$) iron oxides have a limited thermal stability. The yellow iron oxide starts to dehydrate at about 356° F. and its color changes to red. The black iron oxide changes at about the same temperature to γ-$Fe_2O_3$ (brown) and then to red oxide.

In the context of the present invention black iron oxide pigment was found to be a suitable replacement for prior art carbon black in preparing pigmented polycarbonate articles. In a more preferred embodiment black iron oxide pigment and red iron oxide pigments were found to be most suitable in preparing streaking-free, flame-resistant, PTFE containing polycarbonate moldings.

Synthetic iron oxide pigments are known. They may be manufactured for instance by the reduction of mononitrobenzene with metallic iron and are readily available in commerce. Among the suitable iron oxide pigments are the black and red iron oxide pigments marketed under the tradename Bayferrox, from Bayer AG and from Mobay Chemical Corporation.

The pigments which are suitable in the present context, regardless of their origin, are preferably spheroidal in their particle shape and have a predominant particle size between 0.01 and 2 micron, more preferably 0.1 to 0.6 micron. Most preferably the pigment particles are "micronized". The micronized pigments—prepared by Jet milling—are characterized in that their particle size is identical to that of the unmicronized version except that the later feature relatively larger agglomerations whereas the micronized versions are of mostly agglomerations consisting of fewer particles.

Polytetrafluoroethylene (PTFE) is well known in the art and its utility as a drip suppressant in flame retarding formulations of polycarbonate resins has long been recognized. In the context of the present invention, PTFE is used at a level of 0.05% to about 1.0%, preferably 0.10–0.6% relative to the weight of the polycarbonate resin. The preferred PTFE in the present context is of the type that forms fibrils upon the application of shear, known in the art as ASTM-Type 3.

Flame retardant agents for polycarbonate resins are known in the art. These agents have been widely reported in the patent literature and include halogenated compounds, especially brominated compounds and most particularly aromatic brominated compounds. Also included are sulfonate salts of alkali metals or alkaline earth metals. Also included are the complex ion metal salts, such as sodium aluminum fluoride, and phosphorus compounds. The relevant literature includes U.S. Pat. No. 3,146,254, which discloses tri-bisphenol-A ester of phosphoric acid, U.S. Pat. No. 3,823,175 relating to halogenated neopentyl chloroformates, U.S. Pat. No. 4,195,156 entailing disulfonic acid salts and U.S. Pat. No. 4,269,762 relating to tetrahydrocarbylborate salts. Also relevant are U.S. Pat. Nos. 3,027,349 (phosphate polymers), 3,475,372 (metal salts of mercaptobenzotriazoles), 3,509,090 (halogenated organosilicones), 3,535,300 (organo metal salts), 3,557,053 (tris-halophenyl phosphates), 3,597,390 (tris-halophenyl phosphites), 3,775,367 (perfluoro sulfonate salts), 3,836,490 (alkali metal salts), 3,875,107 (alkali metal salts), 4,017,457 (ferrocene), 4,098,754 (alkali metal organic salts), 4,100,130 (sulfur), 4,174,359 (oligomeric tetrabromo polycarbonate and sulfonate salts), 4,223,100 (alkali metal salts, PTFE and an aromatically bound bromine) as well as U.S. Pat. Nos. 3,382,207 (decabromodiphenyl carbonate), 3,647,747 (barium carbonate), 3,651,174 ($BaCO_3$, organosiloxane and PTFE), 3,796,772 (titanates), 3,867,336 (an aryloxy substituted polyhalogenated aromatic compound); U.S. Pat. Nos. 3,931,100, 3,940,366, 3,951,910, 3,953,396, 3,978,024, 4,001,175, 4,007,175, 4,032,506, 4,033,930, 4,039,509, 4,064,101, 4,067,846, 4,073,768, 4,075,164, 4,093,590, 4,093,589, 4,104,245, 4,104,246, 4,115,354, 4,153,595, 4,201,832, 4,263,201, 4,268,429, 3,909,490, 3,917,559, 3,919,167 (sulfonic acid salts), 3,933,734 (sulfonates), 3,948,851, 4,092,291 (sulfone-sulfonic salts), 3,953,399 (carboxylic acid esters), 3,971,756 (alkali metal salts and siloxanes), 4,028,297 (salts of inorganic sulfur oxyacids), 4,066,618 (metal salts of halogenated nonaromatic carboxylic acid), 4,069,201, 4,111,977 (unsubstituted or halogenated oxocarbon acids), 4,104,253, 4,113,695 (halogenated organic metal salts), 4,209,427 (formaldehydes), 4,220,583 (partially florinated olefins), 4,235,978 (organopolysiloxanes), 4,241,434 (alkali or alkaline earth metal salts), 4,254,252 (cyclic polyformates) and 4,366,283 (perhalometalates); the disclosures of each of the above patents is incorporated herein by reference. Preferably the flame retarding agents are complex ion metal salts, sulfonate salts and halogenated aromatic compounds; cryolite is most preferred.

The compositions of the invention may contain about 0.04 to about 4.0 gms of black iron oxide per 1 pound of polycarbonate resin. In the preferred flame resistant embodiment, the compositions contain about 0.06 to about 3.0% of a package of a flame retarding agent and PTFE. Preferably the amount of the flame retarding agent and PTFE is that which is sufficient to render the composition a flammability rating of UL-94-5V (⅛" specimens). More preferably the amount of flame retarding agent is about 0.01 to about 2.0%, most preferably 0.05–1.0%. The amount of iron oxide pigment in the composition is typically about 0.04 to about 4.0 gms per 1 pound of polycarbonate resin.

The invention is further illustrated, but is not intended to be limited by the following examples in which all parts and percentages are by weight unless otherwise specified.

EXAMPLES

Experimental

1. Flame resistant, pigmented polycarbonate compositions were prepared in accordance with the invention and their surface properties in terms of streaking were compared to prior art compositions. Essentially it was found that the PTFE-containing, iron oxide pigmented compositions were streak-free whereas the comparable prior art compositions which were similar thereto in all respects, except for the substitution of carbon black for iron oxide, exhibited an objectionable degree of streaking. In carrying out the comparison, the compositions contained about 96% polycarbonate resin (a 1:1 mixture of linear and branched BPA-derived homopolymers) 0.4% cryolite and 0.31% of PTFE (ASTM Type 3). To this basic composition there were added in the first instance about 3.7% of a color premix package containing carbon black and in the second instance about 3.8% of a similar premix package containing iron oxide based black pigment. The premix package contained about 4% of the iron oxide (black) or about 0.5% of carbon black and about 19% of $TiO_2$ as a co-pigment as well as auxiliary additives such as a thermal stabilizer and a mold release agent neither of which are critical to the invention. The preparation of the compositions and the molding operation followed conventional procedures known in the polycarbonate art. The particular pigment used in the compositions of these examples were Bayferrox 318M, a micronized black iron oxide ($Fe_3O_4$) having a predominant particle size of about 0.2 microns. Visual inspection of parts molded from the compositions (molded on a 6"×6" plaque mold with a melt temperature of 530° F. and a mold temperature of 150° F.) indicated a clear advantage in terms of freedom from streaking to be associated with the parts where iron oxide served as a pigment. The melt indices of the compositions were in the range of about 5–6 gm/10 min; all exhibited a flammability rating of V-0 in accordance with UL-94 (1/16" specimens) and all passed UL-94 5 V rating (⅛" specimens). The mechanical properties of the compositions of the invention were virtually identical to those of the prior art compositions where carbon black was used as a pigment even though substantially more iron oxide derived pigment was used to obtain pigmentation equivalent to the carbon black.

2. The data reported below summarized the findings respecting the properties of iron oxide black, pigmented polycarbonate compositions as a function of the loading of pigment (318M) with and without $TiO_2$ as a co-pigment. The data points to the surprising degree of stability of the iron oxide pigments in polycarbonate moldings, at molding temperatures of up to 650° F.

|  | A[a] | B[a] | C | D |
|---|---|---|---|---|
| Polycarbonate resin | 1 lb. | 1 lb. | 1 lb. | 1 lb. |
| Black Iron Oxide[1] | 0.06 | 0.9 | 0.06 | 0.9 |
| $TiO_2$[1] | 6.8 | 6.8 | — | — |

-continued

| | A[a] | B[a] | C | D |
|---|---|---|---|---|
| Color | Light Grey | Dark Grey | Transparent Black | Opaque Black |
| Melt flow, gm/10 min. | | | | |
| 550° F. molding, 35 sec. cycle time | 10.97 | 10.90 | 10.60 | 11.0 |
| 700° F. molding, 60 sec. cycle time | 14.15 | 16.30 | 13.00 | 12.90 |
| Color stability | | | | |
| Color difference (ΔE) | | | | |
| 550–600° F. | 0.75 | 0.99 | 1.91 | 0.37 |
| 550–650° F. | 0.09 | 0.51 | 3.11 | 0.59 |
| 550–700° F. | 1.53 | 1.76 | 3.65 | 0.60 |
| Impact strength, Izod-Notched, (ft. lbs/in.) | | | | |
| 550° F. molding, 35 sec. | 15.8 | 15.7 | 15.6 | 15.4 |
| 700° F. molding, 60 sec. | 15.8 | 15.8 | 15.7 | 15.5 |
| Relative viscosity, extruded pellets | 1.264 | 1.272 | 1.265 | 1.272 |
| material molded at | | | | |
| 550° F. | 1.264 | 1.267 | 1.267 | 1.272 |
| 650° F. | 1.268 | 1.259 | 1.267 | 1.265 |
| 700° F. | 1.252 | 1.247 | 1.259 | 1.247 |

[1] gms/1 lb. of polycarbonate.
[a] Compositions A and B contain a melt-stabilizer having no criticality to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) polycarbonate resin
   (ii) a flame retarding package and
   (iii) a pigmenting amount of iron oxide based pigment selected from the group consisting of black iron oxide and red iron oxide wherein said flame retarding package comprises a flame retarding agent and polytetrafluoroethylene and is present at a level of 0.06 to 3.0% relative to the weight of the polycarbonate resin.

2. The composition of claim 1 wherein said polytetrafluoroethylene is of ASTM Type 3.

3. The composition of claim 1 wherein said iron oxide has a predominant particle size between 0.01 and 2 micron.

4. The composition of claim 3 wherein said iron oxide is micronized.

5. The composition of claim 1 wherein said polytetrafluoroethylene is present at a level of about 0.05 to about 1.0% relative to the weight of said composition.

6. The composition of claim 1 wherein said polycarbonate resin is a homopolymer based on bisphenol-A.

7. The thermoplastic molding composition of claim 1 wherein said iron oxide based pigment is present at a level of about 0.04 to 4.0 gms per pound of polycarbonate resin.

8. A thermoplastic molding composition comprising
   (i) polycarbonate resin
   (ii) a flame retarding package and
   (iii) iron oxide based pigment selected from the group consisting of black iron oxide and red iron oxide wherein said flame retarding package comprises a flame retarding agent and a polytetrafluoroethylene and wherein said (ii) is present in a sufficient amount to render said composition at least a 5 V-⅛" rating in accordance with UL-94 flammability test.

* * * * *